United States Patent Office 3,005,391
Patented Oct. 24, 1961

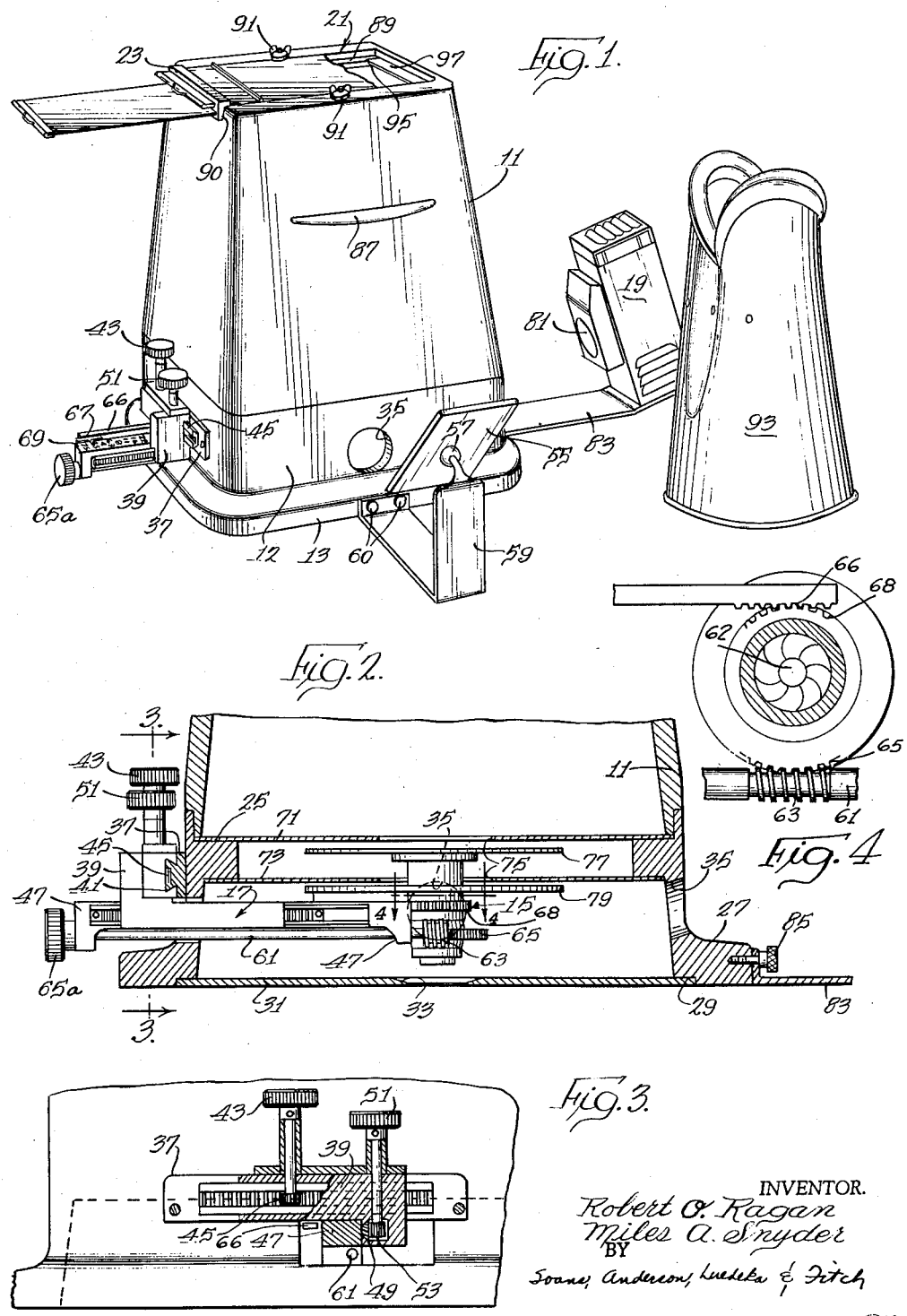

3,005,391
CAMERA
Robert O. Ragan, Oak Park, and Miles A. Snyder, Western Springs, Ill., assignors, by mesne assignments, to Chicago Carton Company, a corporation of Delaware
Filed Sept. 6, 1957, Ser. No. 682,537
5 Claims. (Cl. 95—11)

This invention relates generally to cameras and more particularly to cameras of the photomacrographic type.

In the paper industry as well as in many other industries such as, for example, the textile industry, there exists a need for a method whereby a simple, fast and accurate determination of surface configuration or texture of paper, chipboard, Bristol board or many other items can be easily and inexpensively obtained.

Some situations may require that permanent visual records of the surface configuration be maintained so that, if in the future some question arises as to the quality of a surface, these permanent records may be consulted and the surface quality verified. In other instances, there is a demand for an instrument of simple operation that will allow a simple but accurate instantaneous visual determination of surface texture as a means of insuring continuous production quality.

Determination of surface texture or configuration may be easily made by a visual inspection of a sufficiently magnified presentation of the surface being inspected.

Accordingly, the principal object of this invention is the provision for a new and improved portable camera of the photomacrographic type which may be suitably employed to make a sharp, clearly defined, magnified picture of the surface texture of a material under inspection, or may be employed to present for viewing a clearly defined, magnified image of the surface under inspection.

A further object of this invention is the provision for a camera of the photomacrographic type including a lens which may be positioned within the camera over a selected segment of the surface under inspection, and a mirror which is adapted to be useful in locating the camera over the segment of the surface under inspection.

A further object of this invention is the provision for means within the camera for overlying an identifying legend over the image of the surface under inspection.

A further object of this invention is the provision for a portable camera of the photomacrographic type which may be easily employed by unskilled help with little training, and which may be employed to view directly the surface to be inspected rather than requiring the use of a special sample taken from the material to be inspected.

A still further object of this invention is the provision of a camera of the photomacrographic type that is reduced in cost below other types of inspection and photographic devices available commercially.

Other objects and advantages of the present invention will become obvious by reference to the following description and the accompanying drawings of one embodiment of this invention.

In the drawings:

FIGURE 1 is a perspective view of a camera illustrative of one embodiment of this invention;

FIGURE 2 is a side elevational view, partially in section, of the lower end of the camera shown in FIGURE 1;

FIGURE 3 is a partial sectional view taken along line 3—3 of FIGURE 2; and

FIGURE 4 is an enlarged fragmentary view taken along line 4—4 of FIGURE 2.

The portable camera shown in FIGURE 1, representing one embodiment of this invention, is well suited to produce a well defined, sharply magnified picture of a desired surface area and to be easily operated by unskilled help with little training. Generally, the camera includes a tubular housing comprising an upper section 11 formed with an opening 21 adapted for positioning a cut film holder 23 or a ground glass (not shown) for receiving the image of a surface to be viewed, and a base 13 adapted to be positioned on the surface to be viewed, a lens 15 which may be suitable focused, mounted centrally within the base 13 on a bracket 17 which is adjustably movable to properly locate the field of view of the lens 15, and a light source 19 for illuminating the surface to be viewed.

The base 13 and upper section 11 of the housing are of any suitable light impermeable material that is preferably light yet durable, such as aluminum, and may be suitably obtained as by molding, casting, machining, etc., as may be necessary. Both are preferably blackened on the interior so as to decrease the reflection of any stray light.

The base 13 may be of any desired shape, but in this case, is generally rectangular, having at its open top an interior shoulder 25 adapted to receive the lower end of the upper section 11. The other open end or bottom of the base has a flange 27 in which there is provided a recess 29 adapted to suitably receive a preferably blackened light impermeable protective plate 31 which is attached to the base by suitable means such as screws or the like. This plate is provided for the dual purpose of maintaining flat the surface under inspection upon which the camera is resting in order to maintain constant the distance from the inspected surface to the lens, and of protecting the lens and other parts within the base from damage. Provided centrally in the plate 31 to allow the lens to view the surface under inspection is a funnel shaped hole 33 having its larger diameter inside the camera to prevent a shadow from being cast on the surface under inspection by light cast obliquely towards the surface under inspection from the light source 19. Centrally on each of three sides of the base, there is provided a circular hole 35 for purposes to be hereinafter described.

As before noted, the lens 15 is suitably secured centrally within the base 13 on the adjustably movable bracket 17. The lens views downwardly and is positioned so that the optical axis of the lens is perpendicular to the bottom of the base, i.e., the optical axis of the lens is generally parallel to the axis of the camera housing.

While various lenses may be suitably employed it is desirable that a good quality, color corrected lens with an internal focusing mechanism and an aperture opening adjustable within a wide range be employed in connection with the present camera.

The lens and its field of view may be positioned by micrometer adjustment in a plane normal to the axis of the camera in two directions at right angles to each other to view a particular segment of surface under inspection. Although various adjusting means may be utilized, the preferred embodiment employs the bracket 17 which is broken into three sections 37, 39, and 47. The first or mounting section 37 extends along the front of the base 13 in a plane normal to the axis of the camera and is secured thereto by suitable means. The second section 39 is joined by a dovetail joint 41 to the mounting section 37 and is adjustably movably parallel to the mounting section by a knob 43 operating a rack and pinion 45. The third or supporting section 47 of the bracket extends through the front wall of the base and carries the lens 15. The section 47 is joined by a dovetail joint 49 to the second section and is adjustably movable in a direction transverse to the movement of the second section 39 in a plane normal to the axis of the camera by a knob 51 operating a rack and pinion 53.

The knobs 43 and 51 are provided with suitable calibrations from which one may determine the exact position of the field of view of the lens.

Illumination of the field of view of the camera is provided by a light source 19 of a type commercially available fitted wtih a condensing lens 81. The light source is suitably mounted on a bracket 83 removably attached to the flange of the base by suitable means as for instance thumb screws 85. The bracket is suitably formed to direct a beam of light through one of the aforementioned holes 35 to illuminate the surface under inspection exposed within the hole 33 of the protective plate 31. For most types of material to be viewed an angle of incidence of about 10-15 degrees has proven very satisfactory to properly illuminate the surface to be viewed to get a sharp, clearly defined presentation. In cases where the surface to be viewed is very rough, it is desirable to illuminate the surface from opposing sides and therefore an additional similar source of light mounted on the side opposite the first, illuminating through the appropriate hole 35, may be provided to produce a clearer and sharper definition of the rough surface texture. By providing a light source which is secured to the base, as in the preferred embodiment, the camera may be moved from sample to sample without requiring any readjustment of the light source, and if similar types of surfaces are being photographed, it may be possible to take each of the photographs using the same exposure time.

Accurate and quick setting of the field of view of the lens may be obtained by use in combination of the calibrated knobs 43, 51 and a generally rectangular viewing mirror 55 located exterior to the housing and generally centered on a line passing through the center of one of the holes 35 and intersecting the axis of the housing. The mirror 55 is adjustably mounted on a knuckle joint 57 at the end of a bracket 59 which is removably attached to the flange 27 of the base by suitable means, as for instance, by thumb screws 60.

When the mirror 55 is properly adjusted, an image of the area of the surface under inspection which is exposed within the hole 33 of the protective plate 31 may be clearly seen therein. The position of the lens may be shifted by means of the calibrated knobs 43 and 51 so as to get a desired segment of the exposed area of the surface under inspection within the field of view of the lens. The exact position of the field of view of the lens over the area of the surface exposed within the hole 33 is determined by noting the settings of the calibrated knobs 43 and 51.

In order to reduce glare in the viewing mirror to a minimum, the mirror is desirably located so that the light rays forming an image on the mirror are generally perpendicular to the light rays from the light source 19, illuminating the surface under inspection.

In the disclosed embodiment the mirror 55 and the light source or sources 19, if two are required are all removable from the base and may be interchangeably located as desired.

The surface viewed may be brought into proper focus by adjustment of the distance between the lens and the surface under inspection or by adjustment of the focal length of the lens. In the disclosed embodiment the lens may be focused by rotating a focusing rod 61 having a worm 63 which coacts with a focusing worm wheel 65 forming a part of the focusing mechanism of the lens 15. The focusing rod 61 is carried on the supporting section 47 of the bracket 17, and extends outward of the supporting section having a knob 65a attached thereto for use in adjusting the focal length of the lens.

As seen in FIGURE 4, the aperture opening 62 of the lens may be adjustably set by a sliding mechanism carried on the supporting section 47 and having a rack 66 which coacts with an aperture adjusting gear 68 on the lens. Fixed to the sliding rack at its outer end is a pointer 67 which coacts with calibrations 69 readable on the extending top surface of the supporting section 47 to indicate the setting of the aperture opening.

Located within the base to exclude rays of light from entering the upper section of the housing other than through the lens is a plurality of baffles each lying generally parallel to the bottom of the base. Each of the baffles is fabricated from suitable sheet material which is preferably light impervious and painted black in color. Various baffle arrangements may be suitably employed; however, in this preferred embodiment, the baffle system includes four baffles 71, 73, 77 and 79. The baffles 71 and 73 are secured to the base 13, the upper baffle 71 being secured by suitable means, such as screws, on the interior shoulder 25 and the lower baffle 73 being similarly secured to a bottom surface of the shoulder 25. Both baffles 71 and 73 have central holes 75 only sufficiently big so as not to interfere with movement of the lens or the rays emerging therefrom. The baffles 77 and 79 are suitably secured to the lens, the baffle 77 located intermediate the baffles 71 and 73 and the baffle 79 located beneath the lower baffle 73.

The upper section 11 generally is in the shape of a tubular trapezoidal prism having handles 87 located on two opposite sides for easily carrying the camera from one place to another. The lower end or opening of the upper section is adapted to be received by the base and the upper end or opening is provided with a continuous interior shoulder 89 on three sides and a channel 90 on the front adapted to receive the rectangular cut film holder 23 of conventional construction positioned generally parallel to the bottom of the base, and with the axis of the housing passing through the central portion of the holder. Two thumb screws 91 are provided on the upper surface of the upper section to securely lock the cut film holder 23 in position when exposing the film.

If it is desired to employ the camera as a viewer, a ground glass screen (not shown) may be seated in place of the cut film holder in the upper section. If the surrounding illumination is bright, then a hood 93 may be employed over the top of the upper section to assist in viewing the image of the material under inspection.

When employing the camera to take pictures of various surfaces which will be maintained as a permanent record, an easy method of providing a permanent identification of the surface viewed is very desirable. This is accomplished by providing an additional continuous shoulder 95 along the closed end and partially along the sides of the shoulder 89 adapted to receive a rectangular piece of flat glass 97 substantially the same depth as the shoulder 95. An appropriate identification legend may be made on the top surface of the glass 97 by suitable means, such as a china marking pencil. The marked glass 97 resting in the shoulder 95 is therefore located adjacent to and under the cut film holder 23. The picture resulting from an exposure will present the legend along with the magnified presentation of the surface viewed. When taking a picture of another surface, the glass 97 need only be cleaned, and again marked to provide an easy and proper identification.

If desired, this camera may also be used with color film or with an adapter (not described) for taking pictures of the polaroid type. Stereo type pictures of the postcard type may be taken by a special technique using two exposures and by offsetting by micrometer adjustment the field of view of the lens before the second exposure.

Operation of the described preferred embodiment of the camera to take sharp and well-defined magnified pictures is very simple. The surface to be viewed may be located under the camera by placing the camera over the surface to be inspected or by tilting the camera and sliding the surface to be inspected under the camera. Illumination should now be provided by turning on the light source in order to see the surface to be inspected exposed under the camera. By using the viewing mirror 55, the general area to be viewed may be located within the bounds of the hole 33 in the protective plate 31 and then by adjustment of the calibrated micrometer knobs 43, 51, the field of view of the lens may be exactly positioned over the desired segment of the surface to be inspected. The aperture opening should then be opened wide and the lens focused to produce a sharp and brilliant image on the ground glass screen by adjustment of the focusing knob 65a. The aperture opening should now be closed to a relatively small opening, and the light source turned off. The ground glass screen can now be removed and replaced by a loaded cut film pack. If a permanent identification of the picture to be taken is desired, the transparent plate may be suitably marked and inserted at any time prior to inserting the loaded film pack.

Exposure of the film is accomplished by removing the dark slide from over the unexposed film in the loaded film pack in the upper section of the camera housing, and by simultaneously providing illumination of the surface under inspection by turning on the light source for a predetermined time. The length of time of exposure may be determined by taking into consideration the type of film in use, the color and coarseness of the surface texture within the exposed area, the intensity of illumination (as sometimes two light sources may be employed), and the setting of the aperture opening. The timing of the illumination may be either by a timer attached to the light source, or the operator may time the exposure himself by manually turning on and off the light source. During this period when the surface under inspection is illuminated, some of the light rays which are reflected from the surface under inspection pass through the lens to expose the film carried in the film pack in the upper section of the housing. When the exposure period has elapsed, the illumination should be turned off and the dark slide pushed back over the film to prevent overexposure. Since the aperture opening during the period of exposure of the film is small, the amount of light which strikes the film during the short interval of time when the light source is off is insufficient to fog or otherwise affect the film.

The few simple adjustments are all located on the front of the camera and may easily be mastered. When properly adjusted, the picture resulting will allow easy determination of the surface texture or configuration of the segment inspected. Repeat pictures using the same type of film and taken with the same light source and same aperture opening are always identical.

If desired, exposure of the film may be accomplished when the surface to be viewed is under constant illumination by providing a conventional shutter mechanism in the housing and a means exterior to the housing for controlling the shutter mechanism.

Various changes and modifications may be made in the disclosed construction without departing from the scope of the invention which is to be determined from the appended claims.

We claim:

1. A camera of the class described, comprising a tubular housing having a lower end adapted to be positioned on a surface to be viewed and having a side opening located adjacent said lower end, a lens having an adjustable aperture opening, a bracket mounted on said lower end of said housing for supporting said lens within said housing with the optical axis of said lens generally coinciding with the axis of said housing, means extending exteriorly of said housing through a side wall thereof from within said housing for adjusting the position of said lens in two directions at right angles in a plane normal to the axis of said housing to locate the field of view of said lens for viewing a selected segment of said surface, means for illuminating said surface to be viewed, a reflecting surface supported by said housing exterior thereof in position to view through said opening the area of the surface to be viewed located under said lower housing end, means extending exteriorly of said housing through a side wall thereof from within said housing for focusing a side wall thereof from within said housing for focusing said lens, means for adjusting the aperture opening of said lens, and means at the other end of said housing for positioning a cut film holder or a ground glass screen for receiving an image of the selected segment of the surface to be viewed.

2. A camera of the class described, comprising a tubular housing having a lower end adapted to be positioned on a surface to be viewed and having a side opening adjacent said lower end, a lens having an adjustable aperture opening, a bracket mounted on said lower end of said housing for supporting said lens within said housing with the optical axis of said lens generally coinciding with the axis of said housing, means extending exteriorly of said housing through a side wall thereof from within said housing for adjusting the position of said lens in two directions at right angles in a plane normal to the axis of said housing to locate the field of view of said lens for viewing a selected segment of said surface, means for illuminating said surface to be viewed, a reflecting surface supported by said housing exterior thereof in position to view through said opening the area of the surface to be viewed located under said lower housing end, means extending exteriorly of said housing through a side wall thereof from within said housing for focusing said lens, means extending exteriorly of said housing through a side wall thereof from within said housing for adjusting the aperture opening of said lens, means at the upper end of said housing for positioning a cut film holder or a ground glass screen, and a transparent plate adapted to receive a written legend, said plate being positioned adjacent said upper end of and normal to the axis of said housing so as to immediately underlie the cut film holder when positioned in said upper end of said housing whereby the legend may be presented in overlying relation to the surface viewed.

3. A camera of the class described, comprising a tubular housing having a lower end adapted to be positioned on a surface to be viewed and having a side opening adjacent said lower end, a lens having an adjustable aperture opening, a bracket mounted on said lower end of said housing for supporting said lens within said housing with the optical axis of said lens generally coinciding with the axis of said housing, means extending exteriorly of said housing through a side wall thereof from within said housing for adjusting the position of said lens in two directions at right angles in a plane normal to the axis of said housing to locate the field of view of said lens for viewing a segment of said surface, means for illuminating said surface to be viewed, a reflecting surface supported by said housing exterior thereof in position to view through said opening the area of the surface to be viewed located under said lower housing end, means extending exteriorly of said housing through a side wall thereof from within said housing for focusing said lens, means extending exteriorly of said housing through a side wall thereof from within said housing for adjusting the aperture opening of said lens, baffle means withing the aperture opening of said lens, baffle means within the lower end of said housing to exclude the passage of light to the upper end of said housing except through said lens, means at the upper end of said housing for positioning a cut film holder or a ground glass screen, and a transparent plate adapted to receive a written legend, said plate being positioned adjacent said upper end of and normal to the axis of said housing so as to immediately underlie the cut film holder when positioned in said upper end of said housing.

4. A camera of the class described, comprising a tubular housing having a lower end adapted to be positioned on a surface to be viewed and having a plurality of side openings adjacent said lower end, a lens, a bracket mounted on said lower end of said housing for supporting said lens within said housing with the optical axis of said lens generally coinciding with the axis of said housing, means for adjusting the position of said lens in two directions at right angles in a plane normal to the axis of said housing to locate the field of view of said lens for viewing a selected segment of the surface, a light source exterior to and removably supported by said housing for illuminating the surface to be viewed through one of said openings, a reflecting surface supported by said housing exterior thereto in a position to view through another of said openings the area of the surface to be viewed located under said lower housing end, means for focusing said lens, means for adjusting the aperture opening of said lens, baffle means within the lower end of said housing to exclude the passage of light to the upper end of said housing except through said lens, means at the upper end of said housing for positioning a cut film holder or a ground glass screen, and a transparent plate adapted to receive a written legend, said plate being positioned adjacent said upper end of and normal to the axis of said housing so as to immediately underlie the cut film holder when positioned in said upper end of said housing.

5. A camera of the class described, comprising a tubular housing, said tubular housing including an upper section and a base, said base being adapted to be positioned on a surface to be viewed, said base having a plurality of openings around the sides thereof, a lens, a bracket mounted on said base for supporting said lens within said base with the optical axis of said lens generally coinciding with the axis of said housing, means including a pair of rack and pinions for adjusting the position of said lens within said housing, each of said rack and pinions affording adjustment in one of two directions at right angles to each other in a plane normal to the axis of said housing to thereby locate the field of view of said lens for viewing a selected segment of the surface, a light source exterior to and removably supported by said housing for illuminating through any one of said openings in said base the surface to be viewed, an adjustable reflecting surface removably supported by said housing exterior thereto in a position to view through another of said openings the area of the surface to be viewed within said adjustable field of view of said lens, means for focusing said lens, means including a slide extending exterior to said housing having an interior rack which coacts with a gear for adjusting the aperture opening of said lens, baffle means horizontally extending within said base of said housing to exclude the passage of light to the upper section of said housing except through said lens, means at the upper end of said upper section for positioning a cut film holder or a ground glass screen positioned in a plane normal to the axis of said housing and generally centrally of said axis, and a transparent plate adapted to receive a written legend, said plate being positioned adjacent said upper end of said upper section and normal to the axis of said housing so as to immediately underlie the cut film holder when positioned in said upper end of said upper section.

References Cited in the file of this patent

UNITED STATES PATENTS

| | | |
|---|---|---|
| 1,152,238 | Tessier | Aug. 31, 1915 |
| 1,249,172 | Mullendore | Dec. 4, 1917 |
| 1,304,093 | Potts | May 20, 1919 |
| 1,362,581 | Schmidt | Dec. 14, 1920 |
| 1,375,814 | Bethke | Apr. 26, 1921 |
| 1,470,708 | Blum | Oct. 16, 1923 |
| 1,512,514 | Whiteside | Oct. 21, 1924 |
| 1,570,453 | Smith | Jan. 19, 1926 |
| 1,589,436 | Seebold | June 22, 1926 |
| 1,873,149 | Perez | Aug. 23, 1932 |
| 1,892,683 | Robertson | Jan. 3, 1933 |
| 2,014,437 | Laing | Sept. 17, 1935 |
| 2,069,186 | Hineline | Jan. 26, 1937 |
| 2,351,753 | Flint | June 20, 1944 |
| 2,431,825 | Pollock | Dec. 2, 1947 |
| 2,827,832 | Patterson | Mar. 25, 1958 |